(12) United States Patent
Skaife

(10) Patent No.: US 7,172,780 B1
(45) Date of Patent: Feb. 6, 2007

(54) FOOD PACKAGING FOR MICROWAVE PRESSURE COOKING AND METHOD OF USING SAME

(75) Inventor: William A. Skaife, San Marcos, CA (US)

(73) Assignee: The Vivian A. Skaife Trust, c/o Margaret Skaife, Trustee, San Marcos, CA (US)

( * ) Notice: Subject to any disclaimer, the term of this patent is extended or adjusted under 35 U.S.C. 154(b) by 87 days.

(21) Appl. No.: 10/269,455

(22) Filed: Oct. 11, 2002

(51) Int. Cl.
*A23L 3/01* (2006.01)
*B65B 55/00* (2006.01)

(52) U.S. Cl. .................. 426/234; 426/107; 426/113; 426/118; 426/395

(58) Field of Classification Search ............... 426/107, 426/113, 118, 234, 395
See application file for complete search history.

(56) References Cited

U.S. PATENT DOCUMENTS

| | | | | |
|---|---|---|---|---|
| 2,480,679 A | * | 8/1949 | Spencer | 426/234 |
| 3,228,776 A | * | 1/1966 | Savage et al. | 426/114 |
| 3,465,873 A | * | 9/1969 | Munz | 206/205 |
| 3,672,907 A | * | 6/1972 | Hudson | 426/241 |
| 3,928,045 A | * | 12/1975 | Tsunoda et al. | 99/330 |
| 4,132,811 A | * | 1/1979 | Standing et al. | 426/111 |
| 4,358,466 A | * | 11/1982 | Stevenson | 426/106 |
| 4,390,554 A | * | 6/1983 | Levinson | 426/232 |
| 4,390,555 A | * | 6/1983 | Levinson | 426/234 |
| 4,596,713 A | * | 6/1986 | Burdette | 426/107 |
| 4,961,944 A | * | 10/1990 | Matoba et al. | 426/107 |
| 4,985,300 A | | 1/1991 | Huang | |
| 5,132,151 A | | 7/1992 | Graney | |
| 5,144,106 A | | 9/1992 | Kearns et al. | |
| 5,254,354 A | | 10/1993 | Stewart | |
| 5,260,537 A | | 11/1993 | Beckett | |
| 5,363,978 A | * | 11/1994 | Molo | 220/254.3 |
| 5,370,042 A | | 12/1994 | Tolchin et al. | |
| 5,464,969 A | | 11/1995 | Miller | |
| 5,492,705 A | | 2/1996 | Porchia et al. | |
| 5,558,798 A | | 9/1996 | Tsai | |
| 5,665,411 A | | 9/1997 | Bassetti | |
| 5,726,426 A | | 3/1998 | Davis et al. | |
| 5,989,608 A | * | 11/1999 | Mizuno | 426/113 |
| 6,054,698 A | | 4/2000 | Mast | |
| 6,187,354 B1 | * | 2/2001 | Hopkins | 426/234 |
| 6,380,524 B1 | * | 4/2002 | Keller | 219/725 |
| 6,437,305 B1 | * | 8/2002 | Haamer | 219/735 |
| 6,455,084 B2 | * | 9/2002 | Johns | 426/107 |
| 6,607,764 B1 | * | 8/2003 | Keller | 426/107 |

FOREIGN PATENT DOCUMENTS

| | | | |
|---|---|---|---|
| EP | 443791 | * | 8/1991 |
| JP | 63-131926 | * | 6/1988 |
| JP | 363143424 A | | 6/1988 |
| JP | 63-192410 | * | 8/1988 |
| JP | 3-69482 | * | 3/1991 |

(Continued)

*Primary Examiner*—Arthur L. Corbin
(74) *Attorney, Agent, or Firm*—McKee, Voorhees & Sease, P.L.C.

(57) ABSTRACT

The food packaging is utilized for pressure cooking of food in a microwave with a pressure relief valve being attached to a top wall of the packaging with the relief valve also providing an access opening into the packaging for addition of liquids and other ingredients prior to cooking.

3 Claims, 5 Drawing Sheets

FOREIGN PATENT DOCUMENTS

| | | | |
|---|---|---|---|
| JP | 3-226477 | * | 10/1991 |
| JP | 4-57769 | * | 2/1992 |
| JP | 9-47235 | * | 2/1997 |
| JP | 10-42800 | * | 2/1998 |
| JP | 10-194355 | * | 7/1998 |
| JP | 11-268778 | * | 10/1999 |
| JP | 2000-62857 | * | 2/2000 |
| JP | 2000-85854 | * | 3/2000 |
| JP | 2001-9010 | * | 1/2001 |
| JP | 2001-292708 | * | 10/2001 |
| JP | 2002-177140 | * | 6/2002 |
| JP | 2002-240866 | * | 8/2002 |

* cited by examiner

FOOD PACKAGING FOR MICROWAVE PRESSURE COOKING AND METHOD OF USING SAME

BACKGROUND OF THE INVENTION

This invention relates to packaging food for display in the market, preparing the food for cooking and then microwave cooking the food.

Typical preparation of food for microwaving involves removing food from packaging, placing it in a dish and then placing the dish in the microwave oven for cooking. What is needed is packaging and a method of microwave cooking that utilizes the best features of known cooking methods with the food packaging becoming a cooking vessel for pressure cooking in the microwave oven.

BRIEF SUMMARY OF THE INVENTION

Food is packaged in conventional plastic wrapping material but a liquid feed opening with a relief valve is provided in the top of the package. The relief valve involves a cap having a plurality of openings locked to a well with a top portion of the wrapping material positioned therebetween. An opening in the wrapping material top portion is adapted to communicate with a selected opening in the cap during cooking to relieve excess pressure in the packaging.

Preparatory to placing the packaged food in the microwave, liquid and flavorings may be added to the food in the packaging through the cap wherein liquid travels through the openings into the opening in the top portion of the packaging material and thence into the well and out through an opening in the bottom wall of the well into the packaging with the food to be cooked.

During the microwave cooking, pressure in the packaging builds and inflates the packaging causing gas to be formed which tightly presses the top portion of the packaging against the bottom of the cap over the plurality of openings thereby substantially sealing the packaging to allow for limited pressure cooking. Excess pressure is relieved through the opening in the top portion of the packaging by gas escaping between the top portion and the bottom of the cap to one of the plurality of openings in the cap thus preventing implosion of the packaged food as it is being pressure cooked in a microwave oven. The cap is easily locked to the well with the top portion of the wrapping therebetween by rotating the cap relative to the well whereby outwardly extending ears on the cap move under inwardly extending spaced apart projections on the interior face of well side wall. An angular shoulder on the well side wall supports the cap against the inwardly extending projections. An upwardly standing handle is on the cap for manual engagement in rotating the cap relative to the well during assembly.

Depending on a number of variables including the food being cooked and cooking pressure the size of the opening in the top portion of the wrapping and the plurality of openings in the cap may be varied.

A variety of individually packaged food products may be appropriately packaged for simultaneous cooking in a microwave oven such that an entire meal may be cooked in one operation.

Precise cooking results can consistently be expected by maintaining a record of information including food weight, amount of liquid and flavoring added, cooking vessel used, microwave wattage and cooking time. Once the desired results have been obtained and the cooking information has been determined it may be expected that those same results can be replicated consistently thereafter.

DETAILED DESCRIPTION OF THE PREFERRED EMBODIMENT

Figure 1:
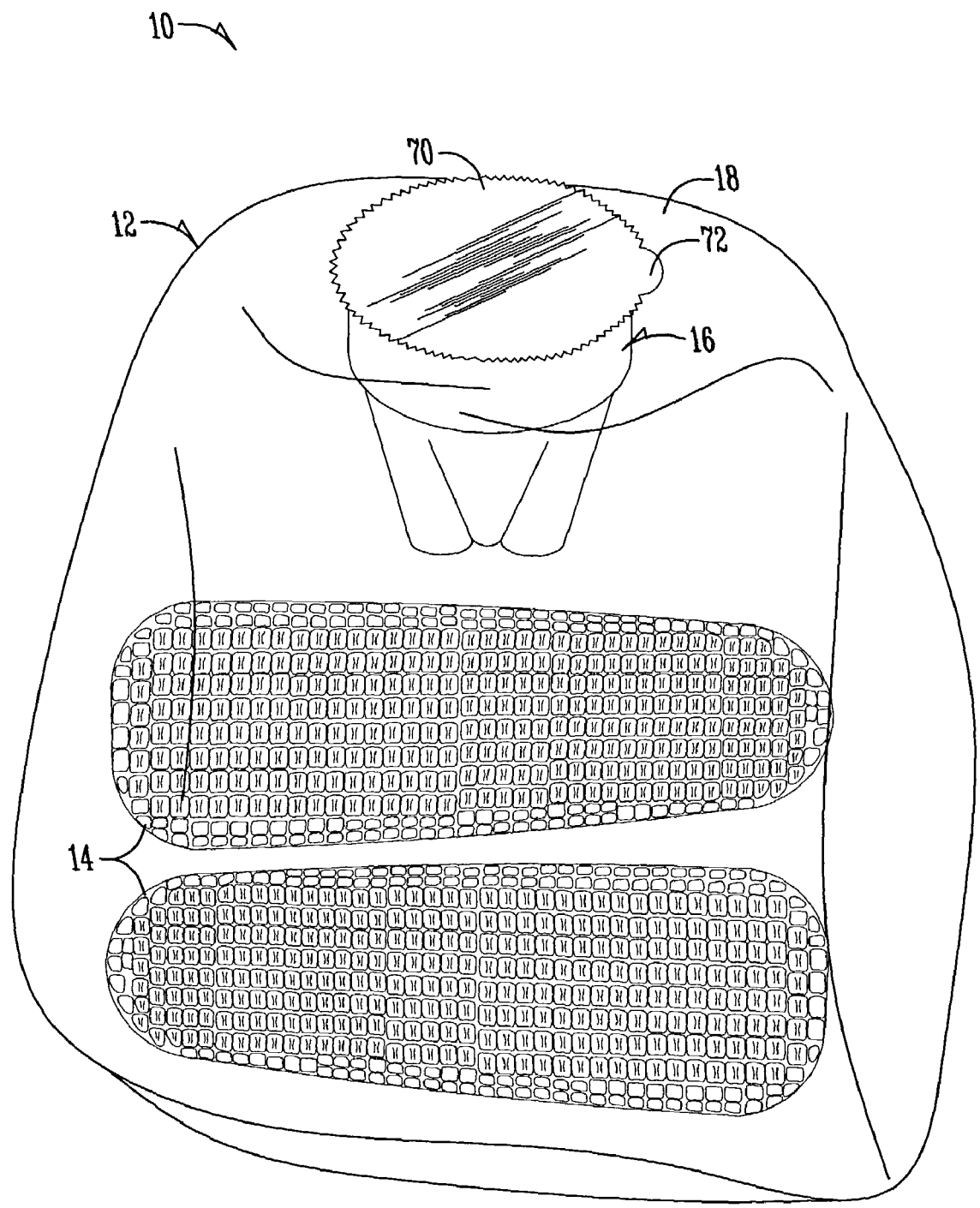
FIG. 1 is a perspective view of the packaged food at the point of purchase in a store.
Figure 2:
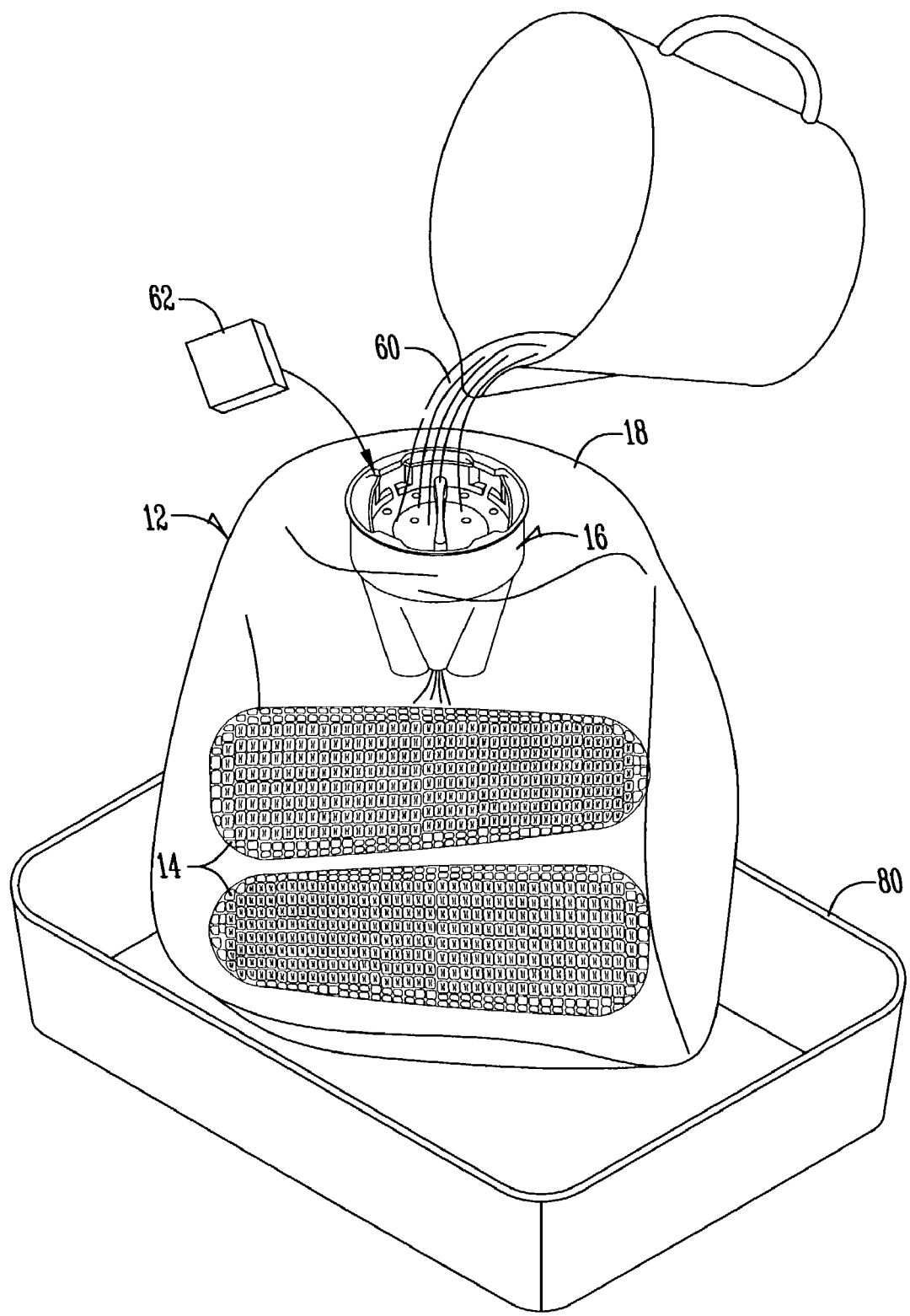
FIG. 2 is a perspective view of the packaged food having been placed in a dish with liquid and other ingredients being added through the cap and well mounted in the top wall of the packaging.
Figure 3:
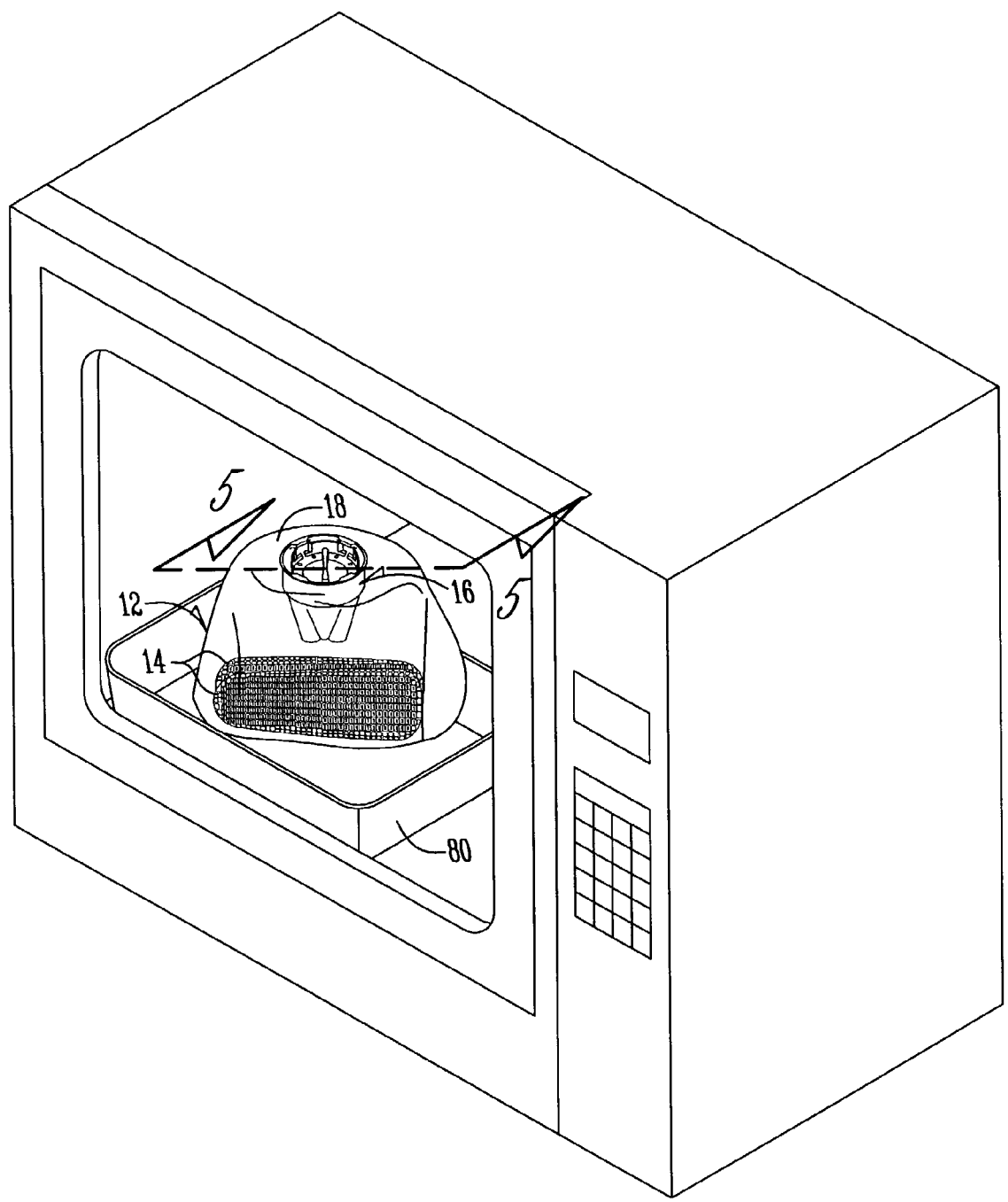
FIG. 3 is a perspective view of the packaged food being cooked in a microwave oven with the packaging being inflated by the microwave heat to provide pressure cooking.

The self contained food packaging for microwave pressure cooking is referred to generally in FIG. 1 by the Reference Numeral 10 and includes plastic wrap material 12 in which ears of corn 14 are placed with a combination relief valve and fill device 16 being mounted in a top wall portion 18 of the wrapping 12.

Figure 4:
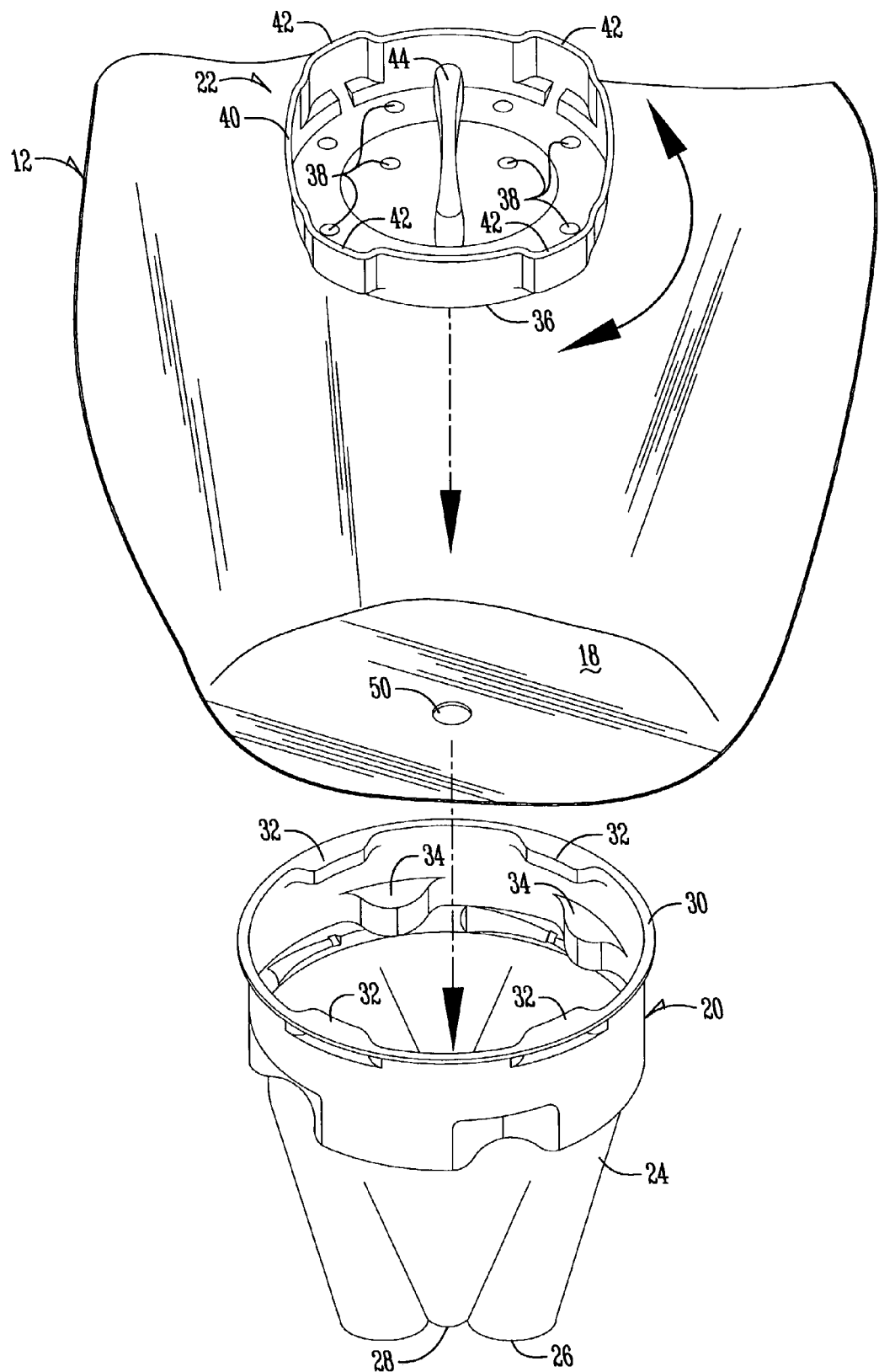
FIG. 4 is a fragmentary exploded view of the cap and top wall portion of the packaging being locked between the cap and the well.
Figure 5:
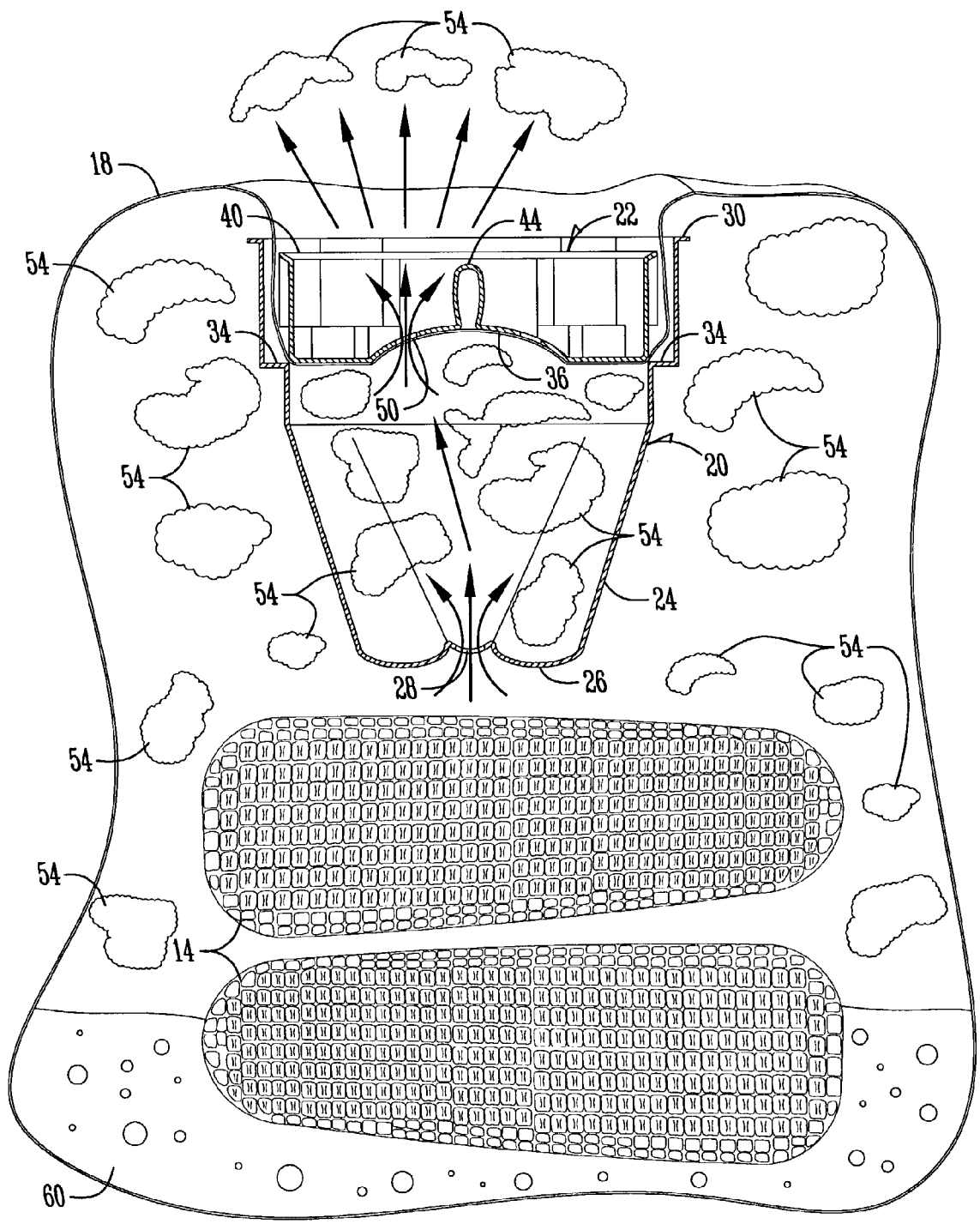
FIG. 5 is a cross-sectional view taken along line 5—5 in FIG. 3 illustrating the valve like release of excess gasses into the well, through the opening in the top portion of the packaging and out through an opening in the cap.

In FIG. 4 the combination relief valve and fill well 18 are seen to include a well 20 in which a cap 22 is positioned with the wrap top portion 18 being interlocked there between. The well 20 includes an annular side wall 24 and a bottom wall 26 which has a central opening 28 as seen in FIG. 5. Side wall 24 includes a top annular edge 30 which includes radially inwardly extending spaced apart projections 32 in staggered relationship with support shoulders 34 therebelow which are spaced apart on the interior face of the side wall 24.

The cap 22 includes a bottom wall 36 having a plurality of openings 38 and an upstanding annular wall 40 which includes outwardly extending spaced apart convex ears 42. An elongated upstanding handle 44 is provided on the top side of the bottom wall 36 for manually rotating the cap 22 relative to the well 20 when the ears 42 are positioned between the projections 32 such that the ears 42 are locked under the projections 32 with the cap bottom wall 36 resting on the support shoulders 34.

An opening 50 in the top portion 18 of the wrap 12 is adapted to allow vapor gasses 54 as seen in FIG. 5 to rise during cooking through the opening 28 in the bottom wall 26 of the well 20 and through the closest opening 38 in the cap bottom wall 36. The pressure within the wrapping 12 otherwise causes the top wall portion 18 to seal closed the other openings 38 more remote to the wrap top wall portion 18 opening 50. All of the openings 38 however are utilized in filling the wrap 12 with liquid 60 and other ingredients 62.

An adhesive seal 70 having a tab 72 as seen in FIG. 1 closes the open top of the cap 22 prior to being removed for adding liquid 60 preparatory to cooking.

It is understood that depending on a number of variables including the food being cooked, the pressure desired and cooking time, the opening 50 in the top portion of the wrap 12 may be varied in size along with the number and size of openings 38 in the cap 22.

Upon the microwave cooking being completed the plastic wrap 12 is cut away from the food 14 and removed from the dish 80 leaving the food 14 ready to be served and eaten. A variety of different foods may be simultaneously cooked in their individual wrappings such that an entire meal may be prepared in one cooking operation.

What is claimed is:

1. A method of microwave pressure cooking packaged food, comprising the steps of:

packaging food in one use packaging having a fill device in a top portion which also functions as a pressure relief valve to allow vapor gasses to rise during cooking through an opening in the fill device and escape through one of a plurality of adjacent openings in a well cap, said well cap openings remote to said fill device opening being sealed by said packaging top portion during cooking, said plurality of well cap openings being utilized in feeding liquid into the packaging through the fill device opening in the packaging top portion, adding liquid to said food in said packaging through said plurality of openings in the well cap and said fill device opening, and pressure cooking in a microwave of said food in said packaging for a predetermined time creating vapor pressure in said packaging with excess pressure being released through said pressure relief valve.

2. The method of microwave pressure cooking packaged food of claim 1 further comprising creating a record of cooking information for a plurality of packaged foods, the record including, weight of food, amount of liquid added, cooking vessel type, wattage of microwave used, and cooking time.

3. The method of microwave pressure cooking packaged food of claim 1 wherein a plurality of individually packaged foods are simultaneously microwave pressured cooked.

* * * * *